(12) United States Patent
Lin et al.

(10) Patent No.: US 7,649,955 B2
(45) Date of Patent: Jan. 19, 2010

(54) MIMO RECEIVER AND METHOD FOR BEAMFORMING USING CORDIC OPERATIONS

(75) Inventors: Xintian E Lin, Mountain View, CA (US); Qinghua Li, Sunnyvale, CA (US); Tein Yow Yu, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 11/618,122

(22) Filed: Dec. 29, 2006

(65) Prior Publication Data

US 2007/0226287 A1    Sep. 27, 2007

Related U.S. Application Data

(60) Provisional application No. 60/785,694, filed on Mar. 24, 2006.

(51) Int. Cl.
*H04B 7/02* (2006.01)
(52) U.S. Cl. ...................................... 375/267
(58) Field of Classification Search ................. 375/260, 375/262, 265, 267, 316, 340, 341, 347; 455/272
See application file for complete search history.

(56) References Cited

U.S. PATENT DOCUMENTS

| | | | |
|---|---|---|---|
| 5,630,154 A * | 5/1997 | Bolstad et al. | ................. 712/19 |
| 6,760,388 B2 | 7/2004 | Ketchum et al. | |
| 6,785,341 B2 | 8/2004 | Walton et al. | |
| 6,940,917 B2 | 9/2005 | Menon et al. | |
| 2003/0185309 A1 * | 10/2003 | Pautler et al. | ............... 375/257 |
| 2006/0023666 A1 | 2/2006 | Jalali et al. | |
| 2006/0092054 A1 | 5/2006 | Li et al. | |
| 2006/0106902 A1 * | 5/2006 | Howard et al. | ............... 708/200 |
| 2006/0155533 A1 | 7/2006 | Lin et al. | |
| 2006/0155534 A1 | 7/2006 | Lin et al. | |
| 2008/0108310 A1 * | 5/2008 | Tong et al. | ..................... 455/69 |

FOREIGN PATENT DOCUMENTS

WO    WO 2007/037716 A1 *    4/2007
WO    WO-2007/112225 A1     10/2007

OTHER PUBLICATIONS

PCT Application No. PCT/US2007/064269, International Search Report mailed Aug. 22, 2007, 4 pgs.
PCT Application No. PCT/US2007/064269, Written Opinion mailed Aug. 22, 2007, 5 pgs.
Shi, J., et al., "Reference Signals for Downlink Beamforming Validation in Wireless Multicarrier MIMO Channel", U.S. Appl. No. 11/455,891, filed Jun. 19, 2006, 24 pgs.

* cited by examiner

*Primary Examiner*—Young T. Tse
(74) *Attorney, Agent, or Firm*—Schwegman, Lundberg & Woessner, P.A.; Gregory J. Gorrie (57) ABSTRACT

Embodiments of a MIMO receiver and method for beamforming using CORDIC operations are generally described herein. Other embodiments may be described and claimed. In some embodiments, complex singular value decomposition (SVD) operations are performed on a channel matrix using CORDIC operations to generate vector elements of a beamforming matrix. An inner product of a first of the vector elements and each of a plurality of stored codewords is computed using CORDIC operations. A recursive dimensional reduction on the beamforming matrix is performed based on the quantized first vector element is performed using CORDIC operations. In some embodiments, the MIMO receiver includes reprogrammable CORDIC circuitry.

19 Claims, 2 Drawing Sheets

PROGRAMMABLE CORDIC OPERATIONS

MIMO RECEIVER AND METHOD FOR BEAMFORMING USING CORDIC OPERATIONS

PRIORITY CLAIM

This patent application claims the benefit of priority under 35 U.S.C. 119(e) to the U.S. Provisional Patent Application Ser. No. 60/785,694, filed Mar. 24, 2006, which is incorporated herein by reference.

TECHNICAL FIELD

Some embodiments of the present invention pertain to wireless communication systems. Some embodiments pertain to beamforming using codebooks in closed-loop multiple-input multiple-output (MIMO) systems. Some embodiments relate to orthogonal frequency division multiplexed (OFDM) communications. Some embodiments relate to COordinate Rotation DIgital Computer (CORDIC) algorithms for calculating trigonometric functions using additions and shift operations.

BACKGROUND

Closed-loop MIMO systems typically transmit channel state information from a receiver to a transmitter over a feedback path. The channel state information may be used to employ beamforming to compensate for the current channel conditions increasing signal-to-noise (SNR) levels at the receiver. In some of these conventional systems, a beamforming matrix may be generated at the receiver based on the channel conditions. Codewords of the codebook may be provided to the transmitter as feedback. The codewords may indicate which beamforming matrix is to be used by the transmitter.

In MIMO systems, the process of determining the beamforming matrix from the channel conditions, searching for the proper codewords, and quantizing the codewords is processing intensive, conventionally requiring many complex multiplication operations. This is particularly an issue in MIMO devices as the number of transmit and receive antennas increase.

Thus, there are general needs for MIMO receivers and methods for providing feedback for beamforming with reduced processing.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
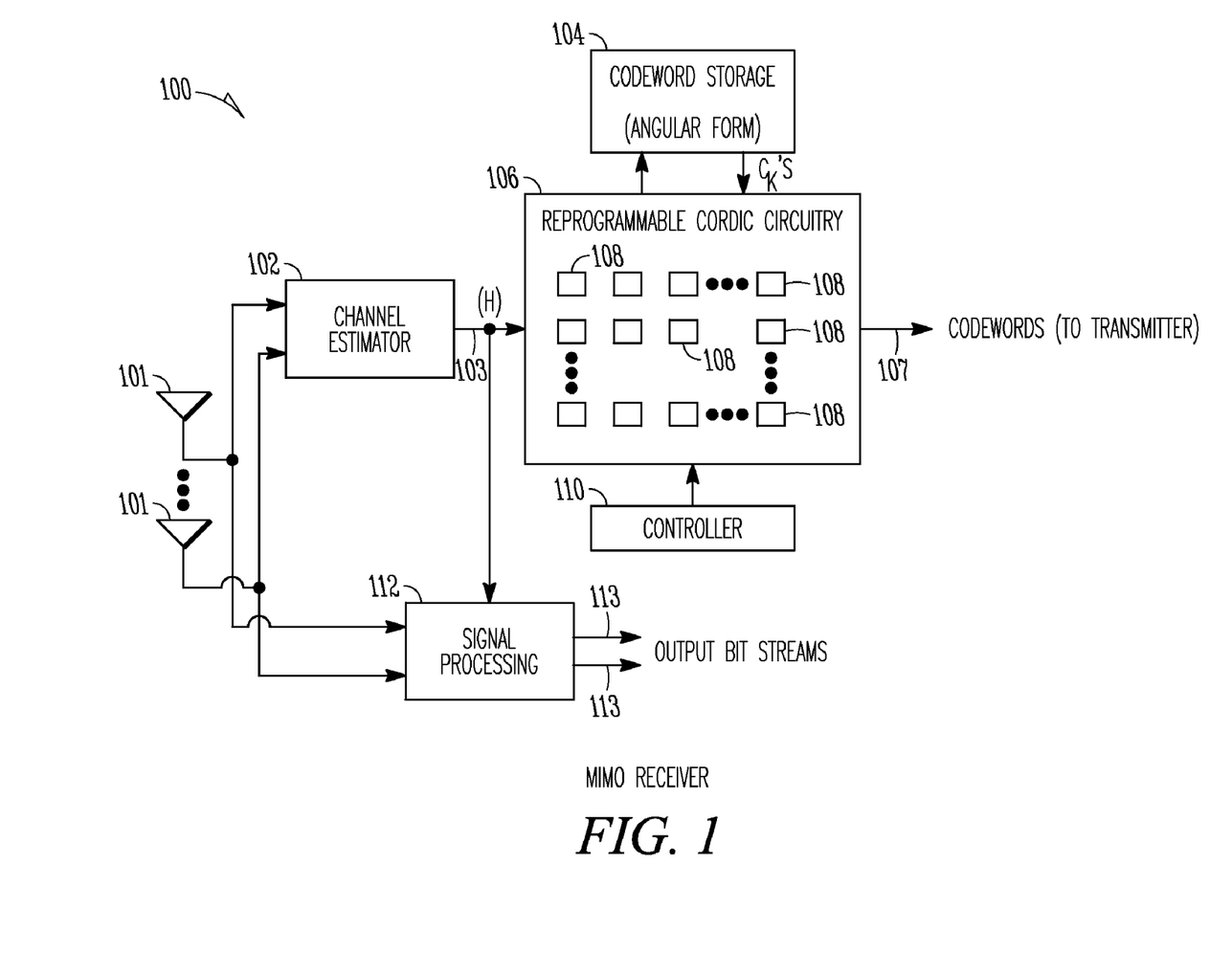
FIG. 1 is a functional block diagram of a MIMO receiver in accordance with some embodiments of the present invention.

FIG. 1 is a functional block diagram of a MIMO receiver in accordance with some embodiments of the present invention. MIMO receiver 100 comprises two or more receive signal paths to receive signals through two or more antennas 101 and channel estimator 102 to generate channel matrix H 103 from the training portions of the received signals. MIMO receiver 100 may also include signal processing circuitry 112 to generate output bit streams 113 from data portions of the received signals. Output bit streams 113 may comprise separate bit streams for each data stream transmitted by a transmitting station, although the scope of the invention is not limited in this respect. MIMO receiver 100 may also include reprogrammable CORDIC circuitry 106 to generate quantized codewords 107, which may be provided back to the transmitting station as feedback for use in beamforming. In some embodiments, quantized codewords 107 may comprise codeword indices, although the scope of the invention is not limited in this respect.

In some embodiments, reprogrammable CORDIC circuitry 106 may comprise a plurality of CORDIC elements 108 which may be reconfigured and/or reprogrammed by controller 110 to perform various CORDIC operations to generate quantized codewords 107. In these embodiments, reprogrammable CORDIC circuitry 106 may perform CORDIC operations using additions and shift operations instead of using multiplication operations. In these embodiments, reprogrammable CORDIC circuitry 106 may be configured to perform complex singular value decomposition (SVD) operations on channel matrix H 103 using CORDIC operations to generate the vector elements of a beamforming matrix V. Reprogrammable CORDIC circuitry 106 may also be configured to compute an inner product of a first of the vector elements and each of a plurality of codewords $C_k$ using CORDIC operations to provide a quantized first vector element. Reprogrammable CORDIC circuitry 106 may also be configured to perform a recursive dimensional reduction on the beamforming matrix V based on the quantized first vector element using CORDIC operations to quantize remaining vector elements of the beamforming matrix as codewords. These embodiments are discussed in more detail below.

In some embodiments, MIMO receiver 100 may include codeword storage element 104 to store the codewords $C_k$ in a non-vector form. The codewords in non-vector form may be used to compute the inner products using CORDIC operations. The non-vector form may comprise a series of rotation angles allowing the CORDIC operations to be performed during the inner product computations. In some embodiments, the codewords $C_k$ may be stored in the non-vector form as a series of complex phase rotations and Given's rotations. In some embodiments, the codewords may be stored in the non-vector form prior to the inner product computations. These embodiments are also discussed in more detail below.

Although MIMO receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of MIMO receiver 100 may refer to one or more processes operating on one or more processing elements.

Figure 2:
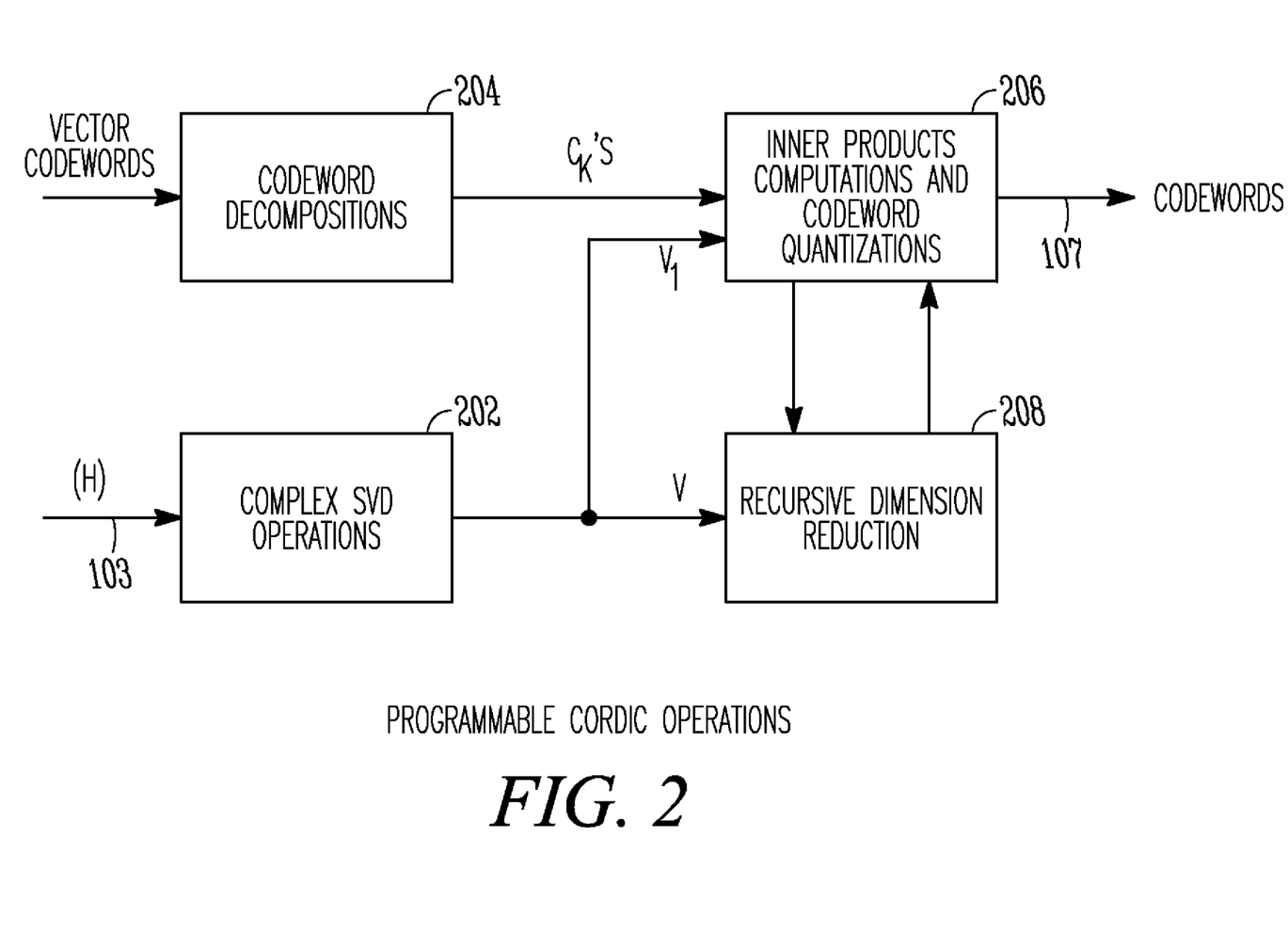
FIG. 2 is a functional block diagram illustrating reprogrammable CORDIC operations in accordance with some embodiments of the present invention.

FIG. 2 is a functional block diagram illustrating reprogrammable CORDIC operations in accordance with some embodiments of the present invention. The reprogrammable CORDIC operations illustrated in FIG. 2 may be performed by reprogrammable CORDIC circuitry 106 (FIG. 1). In these embodiments, controller 110 (FIG. 1) may reconfigure and/or reprogram reprogrammable CORDIC circuitry 106 (FIG. 1) to perform the various CORDIC operations illustrated in FIG. 2.

Referring to FIGS. 1 and 2 together, in some embodiments, reprogrammable CORDIC circuitry 106 may be reconfigured to perform codeword decompositions 204 using CORDIC operations to store codewords $C_k$ in non-vector form as a series of complex phase rotations and Given's rotations. Reprogrammable CORDIC circuitry 106 may be reconfigured to perform complex SVD operations 202 on channel matrix H 103 using CORDIC operations to generate vector elements of a beamforming matrix V. Reprogrammable CORDIC circuitry 106 may be reconfigured to perform inner product computations and codeword quantizations 206 using CORDIC operations. In these embodiments, the inner product of a first vector element $V_1$ and each of the stored codewords $C_k$ may be computed using CORDIC operations to provide a quantized first vector element. Reprogrammable CORDIC circuitry 106 may be also be reconfigured to perform recursive dimensional reduction 208 on the beamforming matrix V based on the quantized first vector element using CORDIC operations. These embodiments are further discussed below.

In accordance with some embodiments, reprogrammable CORDIC circuitry 106 may be used generate quantized codewords for beamforming in a MIMO wireless communication system. In these embodiments, complex SVD operations may be performed on channel matrix H 103 using CORDIC operations to generate vector elements (i.e., 4×1 column vectors $V_1, V_2, V_3$ and $V_4$) of beamforming matrix V. An inner product of the first vector element $V_1$ and each of the stored codewords $C_k$ may be calculated using CORDIC operations to provide a quantized first vector element (i.e., $V_1=C_k$). A recursive dimensional reduction may be performed on the beamforming matrix V based on the quantized first vector element $V_1$ using CORDIC operations to quantize remaining vector elements of the beamforming matrix as codewords. In these embodiments, the codewords $C_k$ used to compute the inner products are in a non-vector form comprising a series of rotation angles. This allows the CORDIC operations to be performed during the inner product computations rather than complex vector multiplication operations. This may result in a significant reduction in processing by reducing and/or eliminating most complex multiplication operations. In some embodiments, the vector elements ($V_1, V_2, V_3$, and $V_4$) of the beamforming matrix V may comprise column vectors, although the scope of the invention is not limited in this respect.

In some embodiments, the complex SVD operations are performed by the one or more CORDIC elements 108, the inner product may be computed by the one or more CORDIC elements 108, and the recursive dimensional reduction may be performed by the one or more CORDIC elements 108. In these embodiments, the CORDIC operations may comprise complex phase rotations and Given's rotations. These embodiments are discussed in more detail below.

In some embodiments, each of a plurality of vector codewords of a vector codebook may be decomposed into the series of complex phase rotations and Given's rotations using CORDIC operations performed by one or more of the CORDIC elements 108. In some embodiments, the codewords may be dynamically generated by parameters stored in codeword storage element 104 using CORDIC operations to represent each codeword by angles instead of vectors.

In some embodiments, the first vector element $V_1$ may be quantized with a codeword, and a recursive dimensional reduction may be performed on the beamform matrix V which may include performing a unitary operation with the quantized vector element $V_1$ using CORDIC operations and a recursive quantization in a lower dimension.

In some embodiments, the CORDIC operations performed for computing the inner products comprises an identification of one or more of the codewords for use in generation of beamforming coefficients at a transmitting station, although the scope of the invention is not limited in this respect.

For symmetric MIMO configurations, in some embodiments, the complex SVD operations may comprise zeroing-out off-diagonal elements of the channel matrix H in an iterative manner by performing CORDIC operations to generate the beamforming matrix V. In these embodiments, the channel matrix H is a square matrix for symmetric MIMO configurations where the number of transmit antennas is the same as the number of receive antennas. The zeroing-out the off-diagonal elements may comprise zeroing-out off-diagonal elements of 2×2 submatrices of the channel matrix in an iterative manner.

For asymmetric MIMO configurations, the complex SVD operations may include performing a QR decomposition on channel matrix $H^+$ by applying complex phase rotations and Given's rotations using CORDIC operations to zero-out preselected elements of the channel matrix to generate an R matrix. SVD operations are then performed on the R matrix to determine the beamforming matrix V. In these embodiments, the channel matrix H is a non-square matrix for asymmetric MIMO configurations where the number of transmit antennas is not the same as the number of receive antennas. In these embodiments, the QR decomposition of a matrix is a decomposition of the matrix into an orthogonal matrix Q and an upper triangular matrix R. QR decomposition may be referred to as orthogonal matrix triangularization. These embodiments are described in more detail below.

In accordance with embodiments, a CORDIC operation that may be performed by any one or more of CORDIC elements 108 may be described by the following equation as rotations in real space.

$$\begin{bmatrix} x_2 \\ y_2 \end{bmatrix} = \begin{bmatrix} \cos\theta & \sin\theta \\ -\sin\theta & \cos\theta \end{bmatrix} \begin{bmatrix} x_1 \\ y_1 \end{bmatrix}$$

In accordance with some embodiments, a 4×4 beam forming matrix may be represented by $V=[V_1, V_2, V_3, V_4]$, where each vector element is a 4×1 column vector. The beamforming matrix V satisfies the relation $V^+V=I$. To quantize the first column vector $V_1$, a four-dimensional complex inner product may be calculated and the maximum may be selected in accordance with the following expression:

$$\hat{V}_1 = \underset{C_k}{\operatorname{argmaxabs}}(<V_1, C_k>), C_k \in C$$

In this equation, codeword $C_k$ (a codebook entry) may be a unit norm vector. With conventional matrix multiplication implementation, four complex multiplications, two more real multiplications, and a square root would be performed to calculate the inner product. Since each complex multiplication may be realized by three real multiplications, the total complexity is 14 real multiplications and one square root.

In accordance with some embodiments of the present invention, reprogrammable CORDIC circuitry 106 may be reconfigured to calculate the inner product and perform SVD computations. The reuse of the existing circuits (i.e., CORDIC elements 108) within reprogrammable CORDIC circuitry 106 may reduce the circuit area needed.

In accordance with some embodiments, each unitary codeword $C_k$ may be expressed as a series of Given's rotations as shown below:

$$C_k = \begin{bmatrix} \cos\theta_{k1}e^{j\varphi_{k1}} \\ \sin\theta_{k1}\cos\theta_{k2}e^{j\varphi_{k2}} \\ \sin\theta_{k1}\sin\theta_{k2}\cos\theta_{k3}e^{j\varphi_{k3}} \\ \sin\theta_{k1}\sin\theta_{k2}\sin\theta_{k3}e^{j\varphi_{k4}} \end{bmatrix}$$

$$= \begin{bmatrix} 1 & & & \\ & 1 & & \\ & & 1 & \\ & & & e^{j(\varphi_{k4}-\varphi_{k3})} \end{bmatrix} \begin{bmatrix} \cos\theta_{k1}e^{j\varphi_{k1}} \\ \sin\theta_{k1}\cos\theta_{k2}e^{j\varphi_{k2}} \\ \sin\theta_{k1}\sin\theta_{k2}\cos\theta_{k3}e^{j\varphi_{k3}} \\ \sin\theta_{k1}\sin\theta_{k2}\sin\theta_{k3}e^{j\varphi_{k3}} \end{bmatrix}$$

$$= \begin{bmatrix} 1 & & & \\ & 1 & & \\ & & 1 & \\ & & & e^{j(\varphi_{k4}-\varphi_{k3})} \end{bmatrix} G(3,4,\theta_{k3}) \begin{bmatrix} \cos\theta_{k1}e^{j\varphi_{k1}} \\ \sin\theta_{k1}\cos\theta_{k2}e^{j\varphi_{k2}} \\ \sin\theta_{k1}\sin\theta_{k2}e^{j\varphi_{k3}} \\ 0 \end{bmatrix}$$

$$= \Psi(4, \varphi_{k4}-\varphi_{k3}) G(3,4,\theta_{k3}) \begin{bmatrix} \cos\theta_{k1}e^{j\varphi_{k1}} \\ \sin\theta_{k1}\cos\theta_{k2}e^{j\varphi_{k2}} \\ \sin\theta_{k1}\sin\theta_{k2}e^{j\varphi_{k3}} \\ 0 \end{bmatrix}$$

$$= \ldots$$

$$= \Psi(4, \varphi_{k4}-\varphi_{k3}) G(3,4,\theta_{k3}) \Psi(3, \varphi_{k3}-\varphi_{k2}) G(2,3,\theta_{k2})$$

$$\Psi(2, \varphi_{k2}-\varphi_{k1}) G(1,2,\theta_{k1}) \begin{bmatrix} e^{j\varphi_{k1}} \\ 0 \\ 0 \\ 0 \end{bmatrix}$$

$$= \left\{ \prod_{n=4}^{2} \Psi(n, \varphi_{kn}-\varphi_{kn-1}) G(n-1,n,\theta_{kn-1}) \right\} \begin{bmatrix} e^{j\varphi_{k1}} \\ 0 \\ 0 \\ 0 \end{bmatrix}$$

Based on the above equation, the inner product may be expressed as:

$$<V_1, C_k> = V_1^+ C_k$$

$$= (V_1^+ C_k)^T$$

$$= C_k^T V_1^*$$

$$= [e^{j\varphi_{k1}}\ 0\ 0\ 0] \left\{ \prod_{n=2}^{4} G^T(n-1,n,\theta_{k,n-1}) \Psi(n, \varphi_{kn}-\varphi_{kn-1}) \right\} V_1^*$$

$$= [e^{j\varphi_{k1}}\ 0\ 0\ 0] \left\{ \prod_{n=2}^{4} G^T(n-1,n,-\theta_{k,n-1}) \Psi(n, \varphi_{kn}-\varphi_{kn-1}) \right\} V_1^*$$

The absolute value of the inner product can be written as shown below.

$$\operatorname{abs}(<V_1, C_k>) = \operatorname{abs}\left( \left\{ \prod_{n=2}^{4} G(n-1,n,-\theta_{k,n-1}) \Psi(n, \varphi_{kn}-\varphi_{kn-1}) \right\} V_1^* \right)_{11}$$

Each complex phase rotation $\Psi(n, \phi)$ on a complex value is one CORDIC. Each Given's rotation $G(i,j,\theta)$ operation on a complex pair $[x_1+y_1 i, x_2+y_2 i]$ includes two CORDIC operations, one each on real and imaginary parts. There are a total of $3*(2+1)=9$ CORDIC operations for each four-dimensional inner product. The absolute value (ABS) function takes one more CORDIC operations. For three-dimensional and two-dimensional inner products, there are seven and four CORDIC operations respectively.

The following table compares computation complexity of vector internal products using multiplier operations and CORDIC operations, where N corresponds to the size of the unitary matrix.

| | N = 2 | N = 3 | N = 4 | N |
|---|---|---|---|---|
| Real multiplication | 8 | 11 | 14 | 3N + 2 |
| CORDIC operations | 4 | 7 | 10 | 3(N − 1) + 1 |

Using 6-bit, 5-bit, and 4-bit codebooks for four-dimensional, three-dimensional, and two-dimensional vector codebooks respectively, the quantization search in the four-dimensional codebooks consumes $2^6*10=640$ CORDIC operations. After the quantization of the first column vector $\hat{V}_1 = C_K$, the V matrix may be transformed by the following operation illustrated below in Equation 3:

$$\prod_{n=2}^{4} G(n-1,n,-\theta_{K,n-1}) \Psi(n, \varphi_{Kn}-\varphi_{Kn-1})[V_1\ V_2\ V_3\ V_4] =$$

$$\begin{bmatrix} e^{j\varphi_{K1}} & 0.0 & 0.0 & 0.0 \\ 0.0 & V_2^1 & V_3^1 & V_4^1 \end{bmatrix}$$

In this equation, $[V_2^1 V_3^1 V_4^1]$ is a 3×3 unitary matrix. Operations on the first column vector $V_1$ may be omitted. This transformation may consume $3*9=27$ operations. In accordance with embodiments, the quantization on the 3×3 unitary matrix $[V_2^1 V_3^1 V_4^1]$ with 5-bit three-dimensional vector codebook and the resulting 2×2 unitary matrix with 4-bit two-dimensional vector codebooks. The total complexity may comprise $2^6*10+3*9+2^5*7+2*6+2^4*4=967$ CORDIC operations.

For embodiments that utilize 2×1 beamforming, $2^{2=4}$ inner products are computed, which comprises 16 CORDIC operations. For embodiments that utilize 4×2 beamforming, $2^4=16$ inner products are computed for the first singular mode, which comprise 160 CORDIC operations. In these embodiments, eight codewords may be selected. The eight codewords may be used to rotate the second column of the beamforming matrix to reduce it to a three-dimensional matrix from a four-dimensional matrix. The matrix reduction may comprise $8*9=72$ CORDIC operations. Computing the three-dimensional inner product with the eight selected codewords may comprise $8*8*7=448$ CORDIC operations. Therefore a total of $160+72+448=680$ CORDIC operations may be performed.

For embodiments that utilize 4×3 beaming, 160 CORDIC operations may be performed to select twelve codewords out of 16 four-dimensional codewords. The dimension reduction of the beam forming matrix may comprise $12*10*2=240$ CORDIC operations. Computing the three-dimensional inner product with eight codewords may comprise $8*12*7=672$ CORDIC operations. Selecting 24 codewords and reducing the beamforming matrix to two dimensions may comprise $24*6=144$ CORDIC operations. The two-dimensional inner product may comprise $24*4*4=384$ CORDIC operations. The total complexity for 4×2 beamforming may comprise $160+240+672+144+384=1600$ CORDIC operations.

In some embodiments, a similar process may be used to perform matrix inner products which may be useful for matrix codebooks based one quantization. In these embodiments, Given's angles may also be extracted from a unitary/orthogonal matrix for efficient storage and/or compressed feedback, as described below.

In accordance with some embodiments, reprogrammable CORDIC circuitry 106 may be reconfigured to perform a complex SVD operation using CORDIC operations. For a real 2×2 matrix A, the 2-sided Jacoby rotation may be illustrated as:

$$B = R(\theta_1)^T A R(\theta_2)$$

This operation may utilize two CORDIC operations, 10 addition operations, and four scaling by ½ operations. For a real 2×2 matrix A, matrix A may be diagonalized and the corresponding rotation angles $\theta_1$ and $\theta_2$ may be calculated by two CORDIC operations, eight addition operations and four scaling by ½ operations.

For a complex 2×2 matrix A, a Cartesian-to-polar coordinate transformation may be performed as follows:

$$A = \begin{bmatrix} a_{11}^r + ja_{11}^i & a_{12}^r + ja_{12}^i \\ a_{21}^r + ja_{21}^i & a_{22}^r + ja_{22}^i \end{bmatrix}$$

$$= \begin{bmatrix} a_{11}e^{j\varphi_{11}} & a_{12}e^{j\varphi_{12}} \\ a_{21}e^{j\varphi_{21}} & a_{22}e^{j\varphi_{22}} \end{bmatrix}$$

This may utilize four CORDIC operations. A complex rotation may be performed as follows to make second column real.

$$\begin{bmatrix} e^{-j\varphi_{12}} & \\ & e^{-j\varphi_{22}} \end{bmatrix} A = \begin{bmatrix} a_{11}e^{j(\varphi_{11}-\varphi_{12})} & a_{12} \\ a_{21}e^{j(\varphi_{21}-\varphi_{22})} & a_{22} \end{bmatrix}$$

The complex rotation may utilize two addition operations. A conversion back to Cartesian coordinate may be performed as follows, which may utilize two CORDIC operations.

$$\begin{bmatrix} e^{-j\varphi_{12}} & \\ & e^{-j\varphi_{22}} \end{bmatrix} A = \begin{bmatrix} a_{11}e^{j(\varphi_{11}-\varphi_{12})} & a_{12} \\ a_{21}e^{j(\varphi_{21}-\varphi_{22})} & a_{22} \end{bmatrix}$$

$$= \begin{bmatrix} c_{11}^r + jc_{11}^i & a_{12} \\ c_{21}^r + jc_{21}^i & a_{22} \end{bmatrix}$$

The $\alpha_{12}$ term may be zeroed out by a Given's rotation as follows:

$$R(\mu)\begin{bmatrix} a_{12} \\ a_{22} \end{bmatrix} = \begin{bmatrix} 0 \\ d_{22} \end{bmatrix}$$

And the terms $\mu$ and $d_{22}$ may be obtained with one CORDIC operation. The following computation may utilize two additional CORDIC operations. Since the first column is complex, the real and imaginary parts each may utilize a CORDIC operation as follows:

$$R(\mu)\begin{bmatrix} e^{-j\varphi_{12}} & \\ & e^{-j\varphi_{22}} \end{bmatrix} A = \begin{bmatrix} d_{11}^r + jd_{11}^i & 0 \\ d_{21}^r + jd_{21}^i & d_{22} \end{bmatrix}$$

A conversion from Cartesian coordinates to polar coordinates may be performed utilizing another two CORDIC operations as follows:

$$R(\mu)\begin{bmatrix} e^{-j\varphi_{12}} & \\ & e^{-j\varphi_{22}} \end{bmatrix} A = \begin{bmatrix} d_{11}^r + jd_{11}^i & 0 \\ d_{21}^r + jd_{21}^i & d_{22} \end{bmatrix}$$

$$= \begin{bmatrix} d_{11}e^{j\phi_{11}} & 0 \\ d_{21}e^{j\phi_{21}} & d_{22} \end{bmatrix}$$

By mathematical manipulation, the following equation may result:

$$\begin{bmatrix} e^{-j(\phi_{11}-\phi_{21})} & \\ & 1 \end{bmatrix} R(\mu) \begin{bmatrix} e^{-j\varphi_{12}} & \\ & e^{-j\varphi_{22}} \end{bmatrix} A \begin{bmatrix} e^{-j\phi_{21}} & \\ & 1 \end{bmatrix} = \begin{bmatrix} d_{11} & 0 \\ d_{21} & d_{22} \end{bmatrix}$$

In some embodiments, an additional addition operation may be performed to compute the U matrix, which is discussed below. In some embodiments, the real Jacoby may be used to diagonalize the following expression $$R(\theta_{1L})\begin{bmatrix} e^{-j(\phi_{11}-\phi_{21})} & \\ & 1 \end{bmatrix}$$

-continued $$R(\mu)\begin{bmatrix} e^{-j\varphi_{12}} & \\ & e^{-j\varphi_{22}} \end{bmatrix} A \begin{bmatrix} e^{-j\phi_{21}} & \\ & 1 \end{bmatrix} R(\theta_{1R}) = \begin{bmatrix} b_{11} & 0 \\ 0 & b_{22} \end{bmatrix}$$

utilizing two CORDIC operations, six addition operations, and four scaling by ½ operations. Since one of the off-diagonal elements is zero, two addition operations may be eliminated. Based on this, a total of 13 CORDIC operations, eight addition operations, and four scaling by ½ operations may be performed to diagonalize a 2×2 complex matrix. The SVD of $A=U\Sigma V^+$ may be obtained from the following equation:

$$\sum = \begin{bmatrix} b_{11} & \\ & b_{22} \end{bmatrix},$$

$$V = \begin{bmatrix} e^{-j\phi_{21}} & \\ & 1 \end{bmatrix} R(\theta_{1R}),$$

$$U = \begin{bmatrix} e^{j\varphi_{12}} & \\ & e^{j\varphi_{22}} \end{bmatrix} R(-\mu) \begin{bmatrix} e^{j(\phi_{11}-\phi_{21})} & \\ & 1 \end{bmatrix} R(-\theta_{1L})$$

In some embodiments, U and V matrixes may be stored in the form illustrated above. The numerical value of the elements of the V matrix may be calculated utilizing two CORDIC operations, and the U matrix may utilize 10 CORDIC operations.

In accordance with some embodiments, reprogrammable CORDIC circuitry 106 may be configured to compute the SVD of any n×n complex matrix utilizing the 2×2 method discussed above by zeroing out the off-diagonal elements one by one. Iterations are performed so that the solution converges. In these embodiments, an n×n complex matrix A may be described by the following equation:

$$A = \begin{bmatrix} a_{11} & a_{12} & & \\ & & B & \\ a_{21} & a_{22} & & \\ & & C & D \end{bmatrix}$$

A single 2-sided Jacoby to zero out off-diagonal element 12 and 21

$$U_{12} \begin{bmatrix} a_{11} & a_{12} \\ a_{21} & a_{22} \end{bmatrix} V_{12}^+ = \begin{bmatrix} b_{11} & 0 \\ 0 & b_{22} \end{bmatrix}$$

utilizes 13 CORDIC operations based on the above. Multiplying out the full matrix results in the following expression:

$$\begin{bmatrix} U_{12} & \\ & I \end{bmatrix} \begin{bmatrix} a_{11} & a_{12} & & \\ & & B & \\ a_{21} & a_{22} & & \\ & & C & D \end{bmatrix} \begin{bmatrix} V_{12}^+ & \\ & I \end{bmatrix} = \begin{bmatrix} b_{11} & & U_{12}B \\ & b_{22} & \\ CV_{12}^+ & & D \end{bmatrix}$$

Accordingly, $U_{12}B$ utilizes 7(n−2) CORDIC operations, and $CV_{12}^+$ utilizes 3(n−2) CORDIC operations. The total operations for one Jacoby may comprise 13+10(n−2) CORDIC operations.

To sweep through all the off-diagonal elements, reprogrammable CORDIC circuitry 106 may utilize n(n−1)/2 2-sided Jacoby operations. If three iterations are performed for good convergence, the estimate of CORDIC operations to calculate the singular values of an n×n complex matrix may be shown as follows:

$$3\frac{n(n-1)}{2}(13+10(n-2))$$

To construct the V matrix, multiple 3n(n−1)/2 terms of $$\begin{bmatrix} e^{-j\phi_{21}} & \\ & 1 \end{bmatrix} R(\theta_{1R})$$

$[e^{-j\phi_{21}}1]R(\theta_{1R})$ may be applied with each term operating on row i and column j with 0<i<j<n. The total number of operations may comprise:
3n(n−1)/2*3n=9n²(n−1)/2 and 3n(n−1)/2*7n=21n²(n−1)/2 for the V and U matrices, respectively.

In asymmetric MIMO configurations such as 2×1, 4×2 and 4×3, where the transmitters have more antennas than the receivers, some embodiments of the present invention may perform SVD by implementing a QR decomposition for complexity reduction. In 4×3 embodiments, instead of computing the SVD for a 3×4 channel matrix $H^+$, reprogrammable CORDIC circuitry 106 may utilize a channel matrix in the form $H^+$. In these embodiments, reprogrammable CORDIC circuitry 106 may begin the QR decomposition by using a Given's rotation to zero out the 41 element of the matrix, which takes one CORDIC operation to extract the phase, and two CORDIC operations to rotate the 42 and 43 elements of the matrix. The Given's rotation takes one CORDIC operation to calculate the angle, four CORDIC operations to rotate elements 42/32 and 43/33 for a total of eight CORDIC operations, as illustrated below.

$$H_{4\times3}^+ = \begin{bmatrix} 1 & & & \\ & 1 & & \\ & & 1 & \\ & & & e^{j(\varphi_{41}-\varphi_{31})} \end{bmatrix} G(3,4,\tan^{-1}(a_{41}/a_{31})) \begin{bmatrix} \times & \times & \times \\ \times & \times & \times \\ \times & \times & \times \\ 0 & \times & \times \end{bmatrix}$$

Similarly, zeroing out elements 13 and 12 of the matrix may unitize 16 CORDIC operations plus one additional CORDIC operation for extracting the angles of element 11. Repeating this for $2^{nd}$ and $3^{rd}$ columns of the matrix utilizes another 11 CORDIC operations and three CORDIC operations, respectively. The total complexity of the QR decomposition for a 4×3 matrix is 25+11+3=39 CORDIC operations, as illustrated by the following:

$$H_{4\times3}^+ = QR = Q \begin{bmatrix} \times & \times & \times \\ 0 & \times & \times \\ 0 & 0 & \times \\ 0 & 0 & 0 \end{bmatrix} = Q \begin{bmatrix} U\Sigma V^+ \\ 0\ 0\ 0 \end{bmatrix}$$

The SVD computation of a 3×3 matrix may utilize 207 CORDIC operations. The beam forming matrix V for the transmitter may be equivalent to $$Q\begin{bmatrix} U \\ 0 \end{bmatrix},$$

which may utilize 54 CORDIC operations. The extraction of the U matrix from the SVD may utilize 189 CORDIC operations. A total complexity for a 4×3 SVD may utilize 39+207+54+189=489 CORDIC operations. The quantization of 4×3 V matrix by a 654 codebook may be the same as the 4×4 V matrix quantization.

In accordance with some embodiments, for a general m×n matrix, with m>n, the QR complexity may be represented as follows:

$$\sum_{k=n}^{1}\{[1+(k-1)+1+2(k-1)][m-(n-k)+1]+1\} =$$

$$n(n+1)\left(n+\frac{1}{2}\right) + \frac{3(m-n)-4}{2}n(n+1) - (m-n-2)n$$

And after SVD computation of the non-trivial part of the R matrix $$R = U\sum V^+,$$

the QR complexity may be represented by the following:

$$\sum_{k=1}^{n}(m-k)\times 3n = 3n^2\left(m-\frac{n+1}{2}\right)$$

Accordingly, significant processing reduction may be achieved when reprogrammable CORDIC circuitry 106 is configured to perform QR decompositions as part of the SVD computations.

Referring to FIG. 1, in some embodiments, MIMO receiver 100 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some embodiments, MIMO receiver 100 may communicate in accordance with a multiple access technique, such as orthogonal frequency division multiple access (OFDMA), although the scope of the invention is not limited in this respect.

In some embodiments, MIMO receiver 100 may be part of a broadband wireless access (BWA) network communication station, such as a Worldwide Interoperability for Microwave Access (WiMax) communication station, although the scope of the invention is not limited in this respect as MIMO receiver 100 may be part of almost any wireless communication device. In some embodiments, MIMO receiver 100 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals received by MIMO receiver 100 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, MIMO receiver 100 may receive signals in accordance with specific communication standards, such as the Institute of Electrical and Electronics Engineers (IEEE) 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Antennas 101 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity.

In some embodiments, MIMO receiver 100 may communicate in accordance with standards such as the Pan-European mobile system standard referred to as the Global System for Mobile Communications (GSM), including communication techniques in accordance with 2.5G and 3G wireless standards (See 3GPP Technical Specification, Version 3.2.0, March 2000). In some embodiments, MIMO receiver 100 may communicate in accordance with other standards or other air-interfaces including interfaces compatible with the enhanced data for GSM evolution (EDGE) standards (see 3GPP Technical Specification, Version 3.2.0, March 2000), although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for beamforming in a multiple-input multiple-output (MIMO) wireless communication receiver, the method comprising:
   performing complex singular value decomposition (SVD) operations on a channel matrix using coordinate rotation digital computer (CORD IC) operations to generate vector elements of a beamforming matrix;
   computing an inner product of a first of the vector elements and each of a plurality of stored codewords using the CORDIC operations to provide a quantized first vector element; and
   performing a recursive dimensional reduction on the beamforming matrix based on the quantized first vector element using the CORDIC operations to quantize remaining vector elements of the beamforming matrix as quantized codewords,
   wherein the stored codewords used to compute the inner products are in a non-vector form comprising a series of rotation angles allowing the CORDIC operations to be performed during the inner product computations.

2. The method of claim 1 wherein the complex SVD operations are performed by one or more of a plurality of CORDIC elements,
   wherein the inner product is computed by the one or more CORDIC elements,
   wherein the recursive dimensional reduction is performed by the one or more CORDIC elements, and
   wherein the CORDIC operations comprise complex phase rotations and Given's rotations.

3. The method of claim 1 wherein the codewords are stored in the non-vector form as a series of complex phase rotations and Given's rotations, and
   wherein the method further comprises storing the codewords in the non-vector form as the series of complex phase rotations and Given's rotations prior to the inner product computations.

4. The method of claim 3 further comprising decomposing each of a plurality of vector codewords of a vector codebook into the series of complex phase rotations and Given's rotations using the CORDIC operations performed by one or more of a plurality of CORDIC elements.

5. The method of claim 1 further comprising quantizing the first vector element with one of the stored codewords, and
   wherein the recursive dimensional reduction performed on the beamforming matrix includes performing a unitary operation with the quantized first vector element using the CORDIC operations and a recursive quantization in a lower dimension.

6. The method of claim 1 wherein the CORDIC operations performed for computing the inner products comprises an identification of one or more of the stored codewords for use in generation of beamforming coefficients at a transmitting station.

7. The method of claim 1 wherein performing the complex SVD operations comprises zeroing-out off-diagonal elements of the channel matrix in an iterative manner by performing the CORDIC operations to generate the beamforming matrix.

8. The method of claim 7 wherein the zeroing-out the off-diagonal elements comprises zeroing-out off-diagonal elements of 2×2 submatrices of the channel matrix in the iterative manner.

9. The method of claim 1 wherein when the channel matrix is a non-square matrix, and
   wherein the complex SVD operations include performing a QR decomposition on the channel matrix by applying complex phase rotations and Given's rotations using the CORDIC operations to zero-out preselected elements of the channel matrix to generate an R matrix and to perform the complex SVD operations on the R matrix to determine the beamforming matrix.

10. A multiple-input multiple-output (MIMO) receiver comprising reprogrammable coordinate rotation digital computer (CORD IC) circuitry comprising a plurality of CORDIC elements to perform complex singular value decomposition (SVD) operations on a channel matrix using CORDIC operations to generate vector elements of a beamforming matrix, compute an inner product of a first of the vector elements and each of a plurality of stored codewords using the CORDIC operations to provide a quantized first vector element, and perform a recursive dimensional reduction on the beamforming matrix based on the quantized first vector element using the CORDIC operations to quantize remaining vector elements of the beamforming matrix as quantized codewords,
    wherein the stored codewords used to compute the inner products are in a non-vector form comprising a series of rotation angles allowing the CORDIC operations to be performed during the inner product computations.

11. The MIMO receiver of claim 10 wherein the CORDIC operations performed by the reprogrammable CORDIC circuitry comprise complex phase rotations and Given's rotations, and
    wherein the MIMO receiver further comprises a controller to:
    reconfigure the CORDIC circuitry to initially generate the stored codewords represented as a series of the complex phase rotations and Given's rotations; and
    reconfigure the CORDIC circuitry to perform the complex SVD operations, compute the inner product and perform the recursive dimensional reduction.

12. The MIMO receiver of claim 11 wherein the reprogrammable CORDIC circuitry is reconfigured to decompose each of a plurality of vector codewords of a vector codebook into the series of complex phase rotations and Given's rotations using the CORDIC operations performed by one or more of the CORDIC elements.

13. The MIMO receiver of claim 10 wherein the reprogrammable CORDIC circuitry is reconfigured to quantize the first vector element with one of the stored codewords, and
    wherein the recursive dimensional reduction performed on the beamform matrix includes configuring the reprogrammable CORDIC circuitry to perform a unitary operation with the quantized vector element using the CORDIC operations and a recursive quantization in a lower dimension.

14. The MIMO receiver of claim 10 wherein the reprogrammable CORDIC circuitry is reconfigured to compute the inner products using the CORDIC operations to identify one or more of the stored codewords for use in generation of beamforming coefficients at a transmitting station.

15. The MIMO receiver of claim 10 wherein the reprogrammable CORDIC circuitry is reconfigured to zero-out off-diagonal elements of the channel matrix in an iterative manner by performing the CORDIC operations to generate the beamforming matrix.

16. The MIMO receiver of claim 10 wherein when the channel matrix is a non-square matrix, and
wherein the reprogrammable CORDIC circuitry is reconfigured to perform the complex SVD operations by performing a QR decomposition on the channel matrix by applying complex phase rotations and Given's rotations using the CORDIC operations to zero-out preselected elements of the channel matrix to generate an R matrix and to perform the complex SVD operations on the R matrix to determine the beamforming matrix.

17. A receiver comprising:
two or more receive signal paths to receive signals through two or more antennas;
a channel estimator to generate a channel matrix from the received signals; and
reprogrammable coordinate rotation digital computer (CORD IC) circuitry comprising a plurality of CORDIC elements to perform complex singular value decomposition (SVD) operations on the channel matrix using CORDIC operations to generate vector elements of a beamforming matrix, compute an inner product of a first of the vector elements and each of a plurality of stored codewords using the CORDIC operations to provide a quantized first vector element, and perform a recursive dimensional reduction on the beamforming matrix based on the quantized first vector element using the CORDIC operations to quantize remaining vector elements of the beamforming matrix as quantized codewords,
wherein the stored codewords used to compute the inner products are in a non-vector form comprising a series of rotation angles allowing the CORDIC operations to be performed during the inner product computations.

18. The receiver of claim 17 wherein the CORDIC operations performed by the reprogrammable CORDIC circuitry comprise complex phase rotations and Given's rotations, and
wherein the receiver further comprises a controller to:
reconfigure the CORDIC circuitry to initially generate the stored codewords represented as a series of the complex phase rotations and Given's rotations; and
reconfigure the CORDIC circuitry to perform the complex SVD operations, compute the inner product and perform the recursive dimensional reduction.

19. The receiver of claim 18 wherein the reprogrammable CORDIC circuitry is reconfigured to decompose each of a plurality of vector codewords of a vector codebook into the series of complex phase rotations and Given's rotations using the CORDIC operations performed by one or more of the CORDIC elements.

* * * * *

UNITED STATES PATENT AND TRADEMARK OFFICE
CERTIFICATE OF CORRECTION

PATENT NO. : 7,649,955 B2
APPLICATION NO. : 11/618122
DATED : January 19, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Twenty-eighth Day of December, 2010

David J. Kappos
*Director of the United States Patent and Trademark Office*